United States Patent

[11] 3,621,436

[72] Inventor Charles T. Wu
 Marlboro, Mass.
[21] Appl. No. 815,709
[22] Filed Apr. 14, 1969
[45] Patented Nov. 16, 1971
[73] Assignee BLH Electronics, Inc.
 Waltham, Mass.

[54] STRAIN GAGE WITH BUILT-IN DUMMY GAGE
 3 Claims, 2 Drawing Figs.
[52] U.S. Cl. .................................................. 338/3,
 338/9
[51] Int. Cl. .................................................. G01b 7/16
[50] Field of Search ........................................... 338/2, 3

[56] References Cited
UNITED STATES PATENTS
2,344,642 3/1944 Ruge .......................... 338/3 E X
3,089,107 5/1963 Dean III ..................... 338/2

Primary Examiner—Richard A. Farley
Assistant Examiner—R. Kinberg
Attorney—Thomson & Mrose ABSTRACT: An electrical strain gage unit including an active strain gage, a laminate formed by an inactive or "dummy" strain gage bonded to a small block of rigid material with the laminate isolated from the active strain gage by a layer of high-lubricity material, a flexible plastic film enveloping the inactive gage and adhesively attached about the periphery thereof to the active strain gage, and a layer of high-lubricity material between the covering and the inactive gage.

PATENTED NOV 16 1971    3,621,436

INVENTOR:
Charles T. Wu
BY Thomson, Wrose & Ericson
ATTORNEYS 3,621,436

1

STRAIN GAGE WITH BUILT-IN DUMMY GAGE

BACKGROUND OF THE INVENTION

The present invention relates to improvements in strain-responsive electrical measurement apparatus and, in one particular aspect, to a novel and improved electrical strain gage unit having an active gage responsive to both strain and external influences and a superpositioned inactive gage isolated from experiencing the strain witnessed by the active gage, so as to be solely and uniquely responsive to other influences.

It has long been well known to measure elastic strains resulting from loading-induced stresses of elements such as beams, columns, rings, diaphragms, and other sensing elements, using electrical strain gages for the accurate translations of the exhibited strains into convenient related variations in electrical impedances. Wire, foil and semiconductor type gages find widespread application in such devices and well lend themselves to manufacture in highly miniaturized forms suitable for installation, by cementing, for example, upon small surface areas of such sensing elements. Pressure, tension, compression, shear, weight, displacement, and so forth, may be either directly indicated by or deduced from readings of electrical instruments, preferably by way of electrical instrumentation of the outputs of Wheatstone bridge circuitry which incorporates the gages.

It is well known that in addition to their responses to load-induced dimensional changes and strain, strain gages also tend to respond adversely to other influences such as temperature, radiation, and the like, whereby the combined responses of the strain gages will not precisely characterize the intended measurement of elastic strains resulting solely from the loading-induced stresses. In the past, it has been sought to use somewhat inactive or dummy gages in combination with the active strain gages with the object of having the dummy gages isolated from that portion of the stressed structure which exhibits the greatest strain; the intended result being that the dummy gages should respond essentially to the same undesirable external influences which affect the active gages. With the active strain gages responding to both strain and external influences, and the dummy gages responding solely to external influence, the gages may be arranged in a Wheatstone bridge circuitry of known form wherein the undesirable effects of the external influences tend to be offset, such that the output should more closely represent the measured strain.

Prior art attempts to utilize dummy or inactive gages in the aforesaid manner have achieved limited success by locating the dummy gages on heavy sections of the structure being stressed, at which locations the strain levels are relatively small. However, such arrangements have not sufficed to compensate to an optimum extent, and have not adequately isolated the dummy gages from responses to the induced stresses. Furthermore, it has been a disadvantage where prior dummy gage arrangements have involved the separate troublesome and costly installation of the active and inactive gages and the wiring associated therewith.

SUMMARY OF THE INVENTION

Accordingly, it is one of the objects of the present invention to provide novel and improved electrical strain gage units of low-cost manufacture which increase precision of strain-responsive measurements by facilitating compensation for undesirable stresses induced by external influences.

Another object of the invention is the provision of a new and improved electrical strain gage unit which is compact and easy to install upon the surface of a structure and which will facilitate compensation for errors resulting from stresses induced by external influences.

It is a further object to provide a compact electrical strain gage unit having a self-contained dummy gage for facilitating compensation for undesirable stresses induced by external influences.

By way of a summary account of practice of this invention in one of its aspects, an electrical strain gage unit is provided with an active strain gage having one surface thereof capable of being bonded to a structural element so as to respond to both strain exhibited by the structural element and to external influence an auxiliary strain gage bonded to a substantially rigid striplike block of material having substantially the same coefficient of thermal expansion as the structural element to which the unit is to be affixed, the block of material being superpositioned parallel to and in close proximity with the active strain gage and the structural element so as to be submitted to substantially the same influences other than strain of the structural element, and a layer of high-lubricity material such as polytetrafluoroethylene, or Teflon, between the active strain gage and the laminate formed by the auxiliary gage and the block of material, whereby strain exhibited by the structural element is prevented from being transferred to the auxiliary gage while, at the same time, the auxiliary gage responds to other effects in the same way as does the active gage.

BRIEF DESCRIPTION OF THE DRAWINGS

Although the features of this invention which are considered to be novel are set forth in the appended claims, further details as to preferred practices and as to the further objects and features thereof may be most readily comprehended through reference to the following description taken in connection with the accompanying drawings, wherein:

DESCRIPTION OF THE PREFERRED EMBODIMENT

Figure 1:
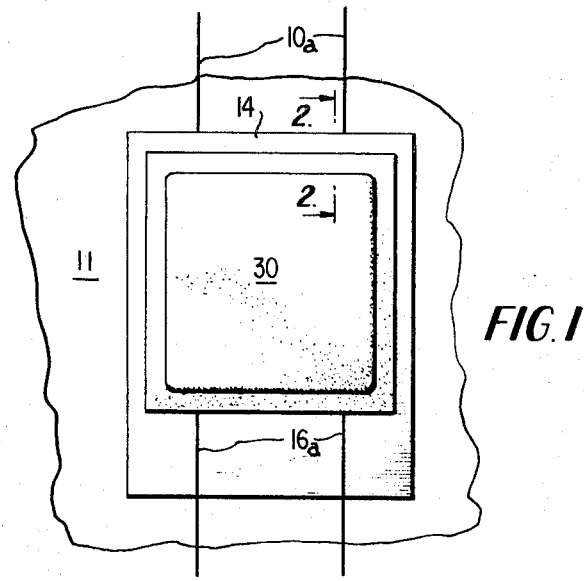
FIG. 1 is a top plan view of the electrical strain gage unit of the present invention.

Referring now to the drawing wherein like reference characters designate identical or corresponding parts throughout the several views, and more particularly to FIG. 1 thereof, there is shown an electrical strain gage unit of the present invention with an active strain gage and an auxiliary or dummy gage formed into a relatively small compact assembly capable of easy installation, such as by bonding in a conventional manner, to a structure exhibiting surface strains resulting from loading.

Figure 2:
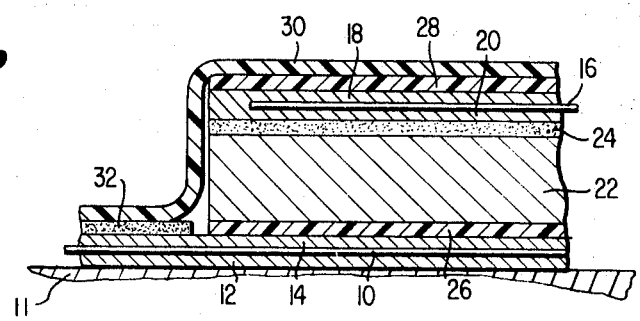
FIG. 2 is an enlarged sectional view taken along the line 2—2 of FIG. 1.

As more clearly seen in FIG. 2, the active strain gage is of a known basic type including an elongated filament 10 wound or otherwise laid in a compact gridlike pattern in which relatively short lengths are closely spaced parallel to one another and have insulating portions 12 and 14 on opposed sides which promote ease of handling and installation upon a surface of a transducer element 11 exhibiting the strains to be measured. An auxiliary or dummy gage of like structure is illustrated as having an elongated filament 16 with insulating portions 18 and 20 on opposed sides thereof. The dummy gage is affixed to a strip of material 22 by a conventional adhesive 24 in the same manner that the active gage is affixed to the structural element or sample being investigated. A thin layer of high-lubricity material 26, such for example as Teflon or other polytetrafluoroethylene material having a low coefficient of friction, separates the strip 22 and the active strain gage. The layer 26 may be in the form of film or a coating applied in any conventional manner to the underside of strip 22. It should be understood that comparable material having a low coefficient of friction and capable of application in a thin layer could be substituted for the Teflon coating 26.

The active strain gage, being bonded to the structure under stress loading, will respond not only to surface strain exhibited as a result of the induced stress, but also in an unwanted manner to other influences such as temperature, radiation and the like. To compensate for and thus overcome effects of the other influences, the prefabricated laminated structure including the dummy gage and essentially rigid strip of material 22 are provided. The material 22 is preferably of a metal having a high modulus of elasticity and about the same coefficient of thermal expansion as the structure or sample to which the active gage is applied, such that material 22 will be affected by any undesirable external influences in the same manner as the stressed element under measurement. Since the high-lubricity plastic layer 26 is provided between material 22 and the active gage, the material 22 and associated auxiliary gage will essentially float freely above the active gage and will thus be isolated from strain exhibited by the structural element to which the underlying active gage is affixed in the usual manner.

A protective covering 30 is attached about the periphery of the active strain gage unit by means of a conventional adhesive 32 so as to envelop the gage and form a compact strain gage unit with a built-in auxiliary gage. The covering 30 is preferably a thin flexible plastic film capable of holding the assembly together without binding the active strain gage to which it is attached. To further avoid inducing or transferring any loading to the auxiliary gage by the cover 30, a layer 28, of polytetrafluoroethylene or similar material is positioned between the cover and the dummy gage.

The metal stock for the strip or "block" of material 22 may be only about 5 mils thick, for example, and the auxiliary gage is bonded to it in substantially the same way that the active gage is to be bonded to the surface of a specimen undergoing test. Even in such small thicknesses the block 22 possesses sufficient rigidity to cause it to remain essentially unstressed by the dimensional changes experienced by the underlying active gage or by the protective cover. Material 22 will respond to temperature influences in about the same way as does the specimen undergoing test, and these temperature-induced dimensional changes in material 22 will in turn cause the auxiliary strain gage 16, bonded to it, to respond to such changes in a desired manner. Limp foillike strips will not suffice to produce these result, and it should be understood that "block" material 22, while having self-sustaining or rigid characteristics, will nevertheless be kept as small and thin as possible in the interests of minimizing bulk. In other arrangements, the auxiliary gage may lie beneath rather than atop the block, and, for other purposes, such as compensation for bending of the block, there may be auxiliary gages bonded to both the top and bottom surfaces of the block, so that these may be electrically connected to effect a desired compensation. Also, there may be more than one active strain gage element, and more than one auxiliary gage and rigid member, within a single gage unit.

The usual form of leads 10a and 16a for the active and auxiliary gages project outwardly of the cover and the insulating coatings, as shown in FIG. 1, such that they may be connected into a conventional Wheatstone bridge circuitry in which the responses of the auxiliary gage 16 offset the corresponding responses of the active gage 10 to influences other than those of the loading under measurement.

It should be understood that the specific practices and preferred embodiment herein referred to have been offered by way of disclosure, rather than limitation, and that various modifications, additions and substitutions may be affected by those skilled in the art without departure from these teachings; it is therefore aimed in the appended claims to embrace all such variations as fall within the true spirit and scope of this invention.

What I claim as new and desire to secure by Letters Patent of the United States is:

1. An electrical strain gage unit comprising an active electrical strain gage having an exposed surface disposed for bonding to a structural element for response to strain exhibited by the structural element under loading applied thereto, a substantially rigid member in the form of a relatively thin strip of metal having a relatively high modulus of elasticity, an auxiliary electrical gage bonded to said substantially rigid member, means mounting said member with said auxiliary gage bonded thereto in close proximity with a surface of said active strain gage which is opposite said exposed surface, and means isolating said auxiliary gage and said substantially rigid member from strains exhibited by the structural element due to loading applied thereto, said isolating means being a layer of polytetrafluoroethylene between said strip of material and said active strain gage, whereby said auxiliary gage responds to substantially the same conditions experienced by said active gage except for conditions resulting from loading applied to the structural element to which the active gage is bonded.

2. An electrical strain gage unit as set forth in claim 1 wherein said layer is in the form of a thin film coating on at least a portion of said member.

3. A prefabricated electrical strain gage unit comprising an active electrical resistance strain gage one side of which is exposed for bonding to a structural element for response to strain exhibited by the structural element under loading applied thereto, a substantially rigid metal strip having substantially the same coefficient of thermal expansion as the structural element, an auxiliary electrical resistance strain gage, means bonding said auxiliary gage to one side of said strip in close proximity with the other side of said active strain gage, means isolating said strip and said auxiliary gage from strains exhibited by the structural element and said active strain gage, a flexible cover enveloping said strip and auxiliary gage and isolating means and further including means adhesively bonding peripheral areas of said cover to said active strain gage, and means isolating said strip and said auxiliary gage from said cover, both of said isolating means comprising layers of material having a relatively low coefficient of friction interposed between said active gage and said strip, and between said auxiliary gage and said cover, respectively.

* * * * *